United States Patent
Chung

(10) Patent No.: US 12,327,022 B2
(45) Date of Patent: Jun. 10, 2025

(54) EFFICIENT DIRECT-ACCESS BUFFER MANAGEMENT IN A DATA COMMUNICATION

(71) Applicant: Guangzhou WeRide Technology Limited Company, Guangzhou (CN)

(72) Inventor: Ji Yoon Chung, San Jose, CA (US)

(73) Assignee: Guangzhou WeRide Technology Limited Company, Guangzhou (CN)

(*) Notice: Subject to any disclaimer, the term of this patent is extended or adjusted under 35 U.S.C. 154(b) by 0 days.

(21) Appl. No.: 18/172,783

(22) Filed: Feb. 22, 2023

(65) Prior Publication Data

US 2024/0281143 A1 Aug. 22, 2024

(51) Int. Cl.
*G06F 3/06* (2006.01)
*B60W 60/00* (2020.01)
*B62D 6/00* (2006.01)

(52) U.S. Cl.
CPC .......... *G06F 3/0613* (2013.01); *G06F 3/0656* (2013.01); *G06F 3/0673* (2013.01); *B60W 60/001* (2020.02); *B60W 2420/403* (2013.01); *B60W 2420/408* (2024.01); *B62D 6/001* (2013.01)

(58) Field of Classification Search
CPC .... G06F 3/0613; G06F 3/0656; G06F 3/0673; B60W 60/001; B60W 2420/403; B60W 2420/408
See application file for complete search history.

(56) References Cited

U.S. PATENT DOCUMENTS

| 2016/0117098 | A1* | 4/2016 | Vijayrao | G06F 3/0673 711/154 |
| 2017/0177518 | A1* | 6/2017 | Chew | G06F 11/3466 |
| 2020/0104072 | A1* | 4/2020 | Ngu | G06F 3/0604 |
| 2020/0117369 | A1* | 4/2020 | Pelster | G06F 3/0619 |

* cited by examiner

*Primary Examiner* — Gary W. Cygiel
(74) *Attorney, Agent, or Firm* — Crowell & Moring LLP

(57) ABSTRACT

The embodiments of the present disclosure are generally directed to zero-duplicate direct-memory-access data buffer management in a data communication interface and are particularly directed to an efficient and collaborative buffer management for data transmission and synchronization between a plurality of data sources (data producers) and a data destination (data consumers) via the data communication interface. In one example, the disclosed buffer management approach combines zero-duplicate buffers, priority-based buffer allocation, priority-based data synchronization, and a collaborative communicated buffer holding time to manage the direct-memory-access and release of buffered data in a real-time and continuous dataflow producer-consumer system.

20 Claims, 6 Drawing Sheets

EFFICIENT DIRECT-ACCESS BUFFER MANAGEMENT IN A DATA COMMUNICATION

TECHNICAL FIELD

The embodiments of the present disclosure are generally directed to zero-duplicate direct-memory-access data buffer management in a data communication interface and are particularly directed to an efficient and collaborative buffer management for data transmission and synchronization between a plurality of data sources (data producers) and a data destination (data consumers) via the data communication interface.

BACKGROUND

Many applications require aggregation of data from various data sources and performance of complex analytics of the aggregated data to generate various real-time control signals and other output. Such data may be communicated continuously from the data sources in the form of real-time data streams. The various data sources may share a common communication interface and data transmission pipeline in providing the data to one or more data consumer devices for performing the data analytics. In these systems, old data quickly becomes stale as new data streams arrive, and yet data transmission and processing resources are generally not unlimited. Data buffers used for managing such data transmission may be shared by the various data sources or by the same data source in time. An effective buffer controller for such a communication interface for data transmission is thus critical in these applications.

SUMMARY

The embodiments of the present disclosure are generally directed to zero-duplicate direct-access data buffer management in a data communication interface and are particularly directed to an efficient and collaborative buffer management for data transmission and synchronization between a plurality of data sources (data producers) and a data destination (data consumers) via the data communication interface.

In some implementations, a method for managing storage buffer is disclosed. The method may include receiving a set of data and a priority timing information item; allocating a storage space in a first storage buffer and storing the set of data in the storage space according to the priority timing information item; synchronizing the set of data with a second storage buffer via a data synchronization channel of a shared serial data communication interface between the first storage buffer and the second storage buffer; receiving at least one buffer holding time information item via an interruption channel in the shared serial data communication interface; and permitting the storage space to be overwritten and refreshed with new data after a holding time according to the at least one buffer holding time information item has expired.

In the implementation above, the set of data and the priority timing information item may be received from a data producer device. The second storage buffer may be associated with a data consumer device. The first storage buffer and the second storage buffer may each include a zero duplicate storage buffer.

In any one of the implementations above, the priority timing information item may include a data synchronization deadline by the shared serial data communication interface.

For example, the priority timing information item may be determined based on a quality of the set of data and/or an operational quality of a data source generating the set of data. A closer deadline value for the data synchronization deadline indicates a higher data priority.

In the implementations above, the data synchronization deadline indicates a priority of the set of data in comparison to data generated among a plurality of data sources. The plurality of data sources may comprise a plurality of sensors.

In the implementations above, each of the plurality of sensors may be associated with a default data synchronization deadline.

In the implementations above, the data synchronization deadlines associated with the plurality of sensors may be dynamically modified.

In the implementations above, each buffer holding time information item includes an initial buffer holding time. The initial buffer holding time is transmitted via the interruption channel by the second storage buffer in response to receiving the set of data from the data synchronization channel, and the holding time corresponds to the initial buffer holding time.

In the implementations above, each buffer holding time information item may also include a supplemental buffer holding time information item. The supplemental buffer holding time information item is transmitted via the interruption channel by following the transmission of the initial buffer holding time from the second storage buffer. The method further includes modifying the holding time from the initial buffer holding according to the supplemental buffer holding time information item.

In the implementations above, the supplemental buffer holding time information item may comprise a request for extension of the holding time. In this case, the method further includes extending the holding time according to the supplemental buffer holding time information item if the storage space has not been subject to refresh yet. If the storage space has been refreshed, the holding time is not extended according to the supplemental buffer holding time information item.

In the implementations above, the supplemental buffer holding time information item may comprise a permission message for reduction of the holding time. In this case, the method further includes reducing the holding time according to the supplemental buffer holding time information item such that the storage space is permitted to be overwritten or refreshed earlier.

In the implementations above, after the supplemental buffer holding time information item has been considered and the holding time has expired, the method further includes refreshing the storage space with new data.

In the implementations above, the first storage buffer, the second storage buffer, and the shared serial data communication interface are part of a control system in an autonomous driving vehicle. The first storage buffer is shared by set of data sources including a plurality of sensors installed in the autonomous driving vehicle, and include at least one camera, LIDAR, RADAR, temperature sensor, infrared camera, or rain detector. In some implementations, the shared serial data communication interface comprises a PCIe interface.

DETAILED DESCRIPTION

Figure 1:
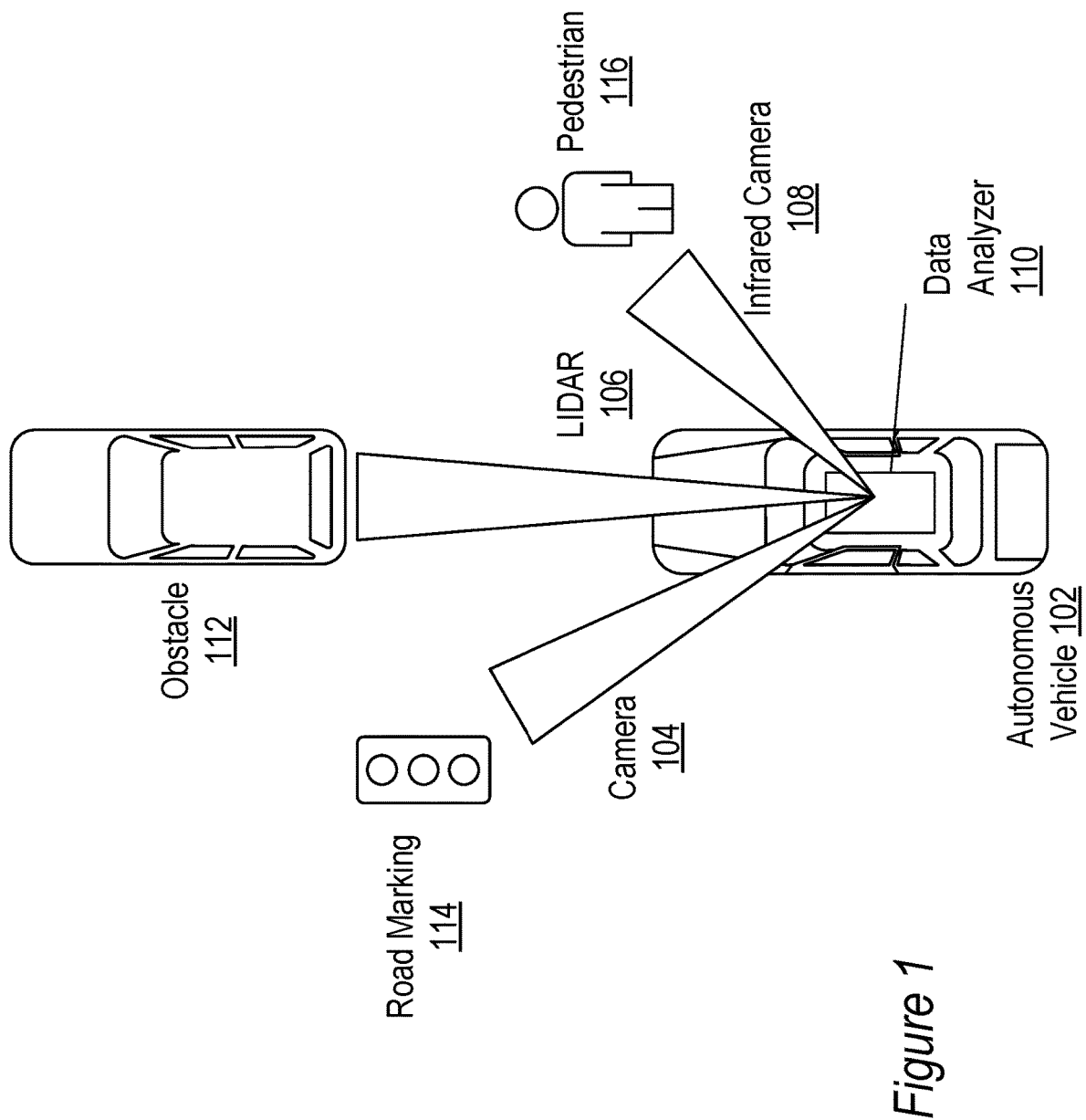
FIG. 1 shows an example diagrammatic depiction of an autonomous driving vehicle including a plurality of data producer devices.

The technologies and examples of implementations and/or embodiments in this disclosure are applicable to control of zero-duplicate buffers in any data communication interface involving asynchronous transmission of real-time data stream between a set of data producing source devices and one or more data consumer devices (alternatively referred to as data consuming destination devices). The term "exemplary" is used to mean "an example of" and unless otherwise stated, does not imply an ideal or preferred example, implementation, or embodiment. The implementations may be embodied in a variety of different forms and, therefore, the scope of this disclosure or claimed subject matter is intended to be construed as not being limited to any of the embodiments set forth below. The various implementations may be embodied as methods, devices, components, or systems. Accordingly, embodiments of this disclosure may, for example, take the form of hardware, software, firmware or any combination thereof.

The example zero-duplicate data buffer management system of the present disclosure involves transferring datasets or data streams from at least one data producer device to one or more data consumer devices in a time efficient and quasi-synchronous manner. For the transmission of the datasets or data streams, the at least one data producer device and the one or more data consumer devices may share a common data transmission interface. To achieve this goal, the disclosed zero-duplicate data buffer management system relies on a transmission/synchronization of the datasets across a data communication channel with zero-duplicate buffers on both ends. By using a zero-duplicate approach to the buffer management, the system is significantly less complex and is able to more efficiently and quickly transmit/synchronize data from the data producer to the data consumer while maintaining data availability in a direct-memory-access (DMA) mode because no additional copies of the data are required. That is, besides the originals, there are no intermediate copies of the data which need to be managed in conjunction with the primary buffers in the process of transmitting/synchronizing the data.

In addition, while the data production and the data consumption are overall asynchronous, the data communication channels in the data communication interface may be implemented as synchronous or near-synchronous channels when allocated and triggered for various datasets. In other words, once one or more data channels in the data communication interface are assigned to a section of the zero-duplicate buffers on the producer and consumer sides, the corresponding section of the buffers are synchronized or nearly synchronized between the producer side buffer and the consumer side buffer (in other words, any change of data in that buffer section would be almost instantaneously synchronized on both the producer and consumer sides for direct-memory-access). The example zero-duplicate buffer management system disclosed herein may be configured to control when the one or more synchronous data channels in the data communication interface are assigned to a section of the buffer and released for use by other sections. As such, the data communication between the producers and the consumers is overall asynchronously managed in one aspect but yet is synchronous in another aspect, hence the term quasi-synchronous.

The example zero-duplicate data buffer management system disclosed herein includes generally of at least one data producer, a buffer controller, a zero-duplicate storage buffer for the at least one data producer, a data communication interface including data channels and control channels, and one or more consumer devices (with corresponding consumer side zero-duplicate buffer, and buffer controller). A data producer, for example may include one or more sensors which produce a plurality of datasets in the form of data streams or data packets to be analyzed by the data consumers. The data streams, for example, may be continuously produced as data frames, e.g., one data packet or one data frame per period of time (e.g., every 10 ms, every 100 ms, etc.).

The buffer controller on the data producer side, for example, may be configured to provision the zero-duplicate data buffer management system by allocating and releasing storage space within the zero-duplicate storage buffer for holding time-sensitive data streams from the at least one data producer with various priority characteristics. Such buffer controller on the data producer side thus controls when new data may be written to the buffer, where the new data may be written in the buffer, which portion of the zero-duplicate storage buffer should be released of previous data and permitted to be overwritten without affecting data availability to the consumer devices.

In the various example embodiments where multiple data producers are present, the zero-duplicate buffer controller is also responsible for prioritizing datasets or data streams from the one or more producers according to their timing and priority characteristics. In this disclosure, the zero-duplicate buffer controller may be alternatively referred to a buffer controller.

In some example implementations, various level of data priorities may be attributed to the data producers (and thus the datasets produced therefrom) based on a number of factors including intrinsic properties and the nature of the data producer and characteristic properties of the datasets or data streams produced by the data producers. The various level of data priories associated with each of the data producers may be predetermined or may be given by default. Such default data priorities may be fixed during the data production, communication, and analytics processes.

Alternatively, such default data priorities may be dynamic and may be modified during the data production, communication, and analytics processes. More specifically, priority of a particular data producer may be increased or decreased based on the operational status of the particular data producer or the quality of the datasets or data streams generated by the particular data producer. The quality of the datasets may be measured in absolute sense or may be measured as relative quality levels among the various producer devices.

For example, priority level of a particular data producer may depend on the operational status of other data producers sharing the zero-duplicate storage buffer and the data communication interface. For example, data priority of a data producer experiencing degradation on data production compared to other data producers may be lowered with respect to the other data producers which maintain normal operations. Furthermore, data producers which produce data with higher time sensitivity may be prioritized over data producers which are less time sensitive. The priority levels of a data producer may be evaluated and adjusted depending on the number of functional data producers of similar types.

Another example factor which may be used to determine priority of the data producers may include a refresh time or frequency of the data. For example, a data producer which produces new and useful information every 10 milliseconds may be prioritized over a data producer which produces new and useful information every 100 milliseconds.

The priority of a dataset associated with a data producer thus may be determined according to various example combinations of the various example factors described above.

Once a data producer is assigned or associated with a priority level, the corresponding dataset may be further assigned a corresponding priority timing information item which dictates and quantifies the priority of the dataset or data stream produced by the data producer until such priority timing information is modified. This priority timing information item may be ranked among datasets queued for transmission/synchronization and may be further considered in order to ensure that datasets or data streams with the highest priority information items are allocated to the zero-duplicate buffer first, and that the allocated sections of the buffer are assigned with synchronous data channels in the data communication interface for timely data transmission and synchronization between producer-side buffer and the consumer-side buffer.

The zero-duplicate storage buffer may be implemented as a data storage unit which is capable of being subdivided into a plurality of storage blocks or units to store datasets of different sizes. While the zero-duplicate storage buffer is capable of storing multiple datasets simultaneously, it does not have an infinite or unlimited storage capacity, and therefore, the available storage must be delegated frugally by the buffer controller. Thus, the priority timing information item associated with each dataset ensures that the zero-duplicate storage buffer is allocated, released, and refreshed, and that the synchronous data channels in the data communication interface are assigned and released in the most efficient manner possible.

The storage space in the zero-duplicate storage buffer may be allocated to data streams from the data producers in the granularity of storage blocks. Alternatively, the data space may be allocated into smaller granularity levels. A data stream may be allocated to a continuous section of physical storage space in the zero-duplicate storage buffer. Alternatively, a data stream may be allocated in discontinuous segments of storage space in the zero-duplicate storage buffer. In some example implementations, the zero-duplicate buffer controller may include a storage map that keeps track of a correspondence between data streams and released storage space (free storage space) in the zero-duplicate storage buffer and corresponding storage location pointers.

The allocation of the storage space in the zero-duplicate storage buffer for a dataset from a data producer may be managed by the buffer controller according to the priority timing information item associated with data producer or the dataset. In general, the free or released space in the zero-duplicate buffer may be allocated during a time window to datasets from the various data producers according to the priority of the dataset or priority of the corresponding data producers. As described in further detail below, an example of such priority timing information item for a dataset may represent a deadline information for initiating transmission/synchronization of the dataset from the producer side to the consumer side. The buffer controller, for example, may first allocate storage space in the zero-duplicate storage buffer for datasets accumulated during the time window having the closest transmission/synchronization deadlines.

Once a buffer block or segment has been allocated to a dataset and the dataset has been stored in the allocated buffer space, the dataset is ready to be synchronized to the data consumer via an assigned data communication channel of the data communication interface. However, since the zero-duplicate data buffer management system only uses a single copy of the data throughout the entire data synchronization and sharing process in both the producer side and the consumer side, and that the synchronous data communication channels available in the data communication interface may be limited, the buffer controller may be further configured to determine when a particular buffer section should be synchronized by requesting one or more data channels from the communication interface.

Such data communication between the producer side buffer and the consumer side buffer via assigned synchronous data channels in the communication interface is, again, referred to as quasi-synchronization because the assignment and release of the synchronous channels in the data communication interface for the transmission or synchronization of datasets may be further prioritized and controlled according to the data priority of the datasets as described above.

Such prioritization and control of the data synchronization between the data producer side buffer and the data consumer side buffer via synchronous data channel assignment and release may be implemented by an earliest deadline first (EDF) arbitrator (EDFA). The EDFA may be considered as part of the buffer controller. In particular, the EDFA may select the datasets in the zero-duplicate storage buffer with the highest priority information items and initiate a synchronization of the dataset via one or more synchronous data communication channels across the communication interface. The purpose of implementing an EDFA is to ensure that the quasi-synchronization of the datasets is timely initiated prior to its delivery deadline and that the synchronous channels of the data communication interface are efficiently utilized.

Since only a single copy of this dataset exists (the copy in the zero-duplicate storage buffer) on each of the producer and consumer sides, it is critical that this copy of data on the producer side buffer is not released, overwritten, deleted, or altered in any way during the time that the corresponding data on the consumer side is synchronized and is still being used or accessed by the consumer in the direct-memory-access mode. Alteration of the quasi-synchronized datasets on the producer side buffer before the data consumer or data consumers have finished using or access the corresponding dataset would potentially result in inadvertent data spoliation.

To prevent immature alteration of the dataset after the data synchronization is initiated but before the data consumers have finished using it under direct-memory-access mode, a buffer holding mechanism may be implemented. In some example implementations, a buffer holding time information item for a dataset may be generated from the data consumer side. For example, a data consumer may determine a data access or processing time associated with a quasi-synchronized dataset. The data access or processing time may indicate a time duration that the buffer controller on the producer side needs to hold the dataset in the producer side buffer before the buffer space is released. Such buffer holding time information with respect to the dataset may be communicated via, for example, a control channel or other messaging channels of the data communication interface to the buffer controller on the data producer side, which would then hold the buffer space for preventing the dataset on the producer side from being overwritten before the buffer holding time expires.

An example method is described below. In the first step of this method, the EDFA may select a dataset at the producer side with the earliest deadline and initiate a synchronization of the dataset stored in the buffer with the consumer-side buffer. Such synchronization, for example, may involve calling a data synchronization function of the data communication interface between the data producers and the data consumers to assign one or more synchronous data channels. Upon initiation of data synchronization via the assigned synchronous data channels and receiving the dataset via the synchronous data channels of the data communication interface, the data consumer determines a buffer holding time information item which indicates how long the dataset needs to be held intact at the producer side buffer. During this buffer holding time, it is desired by the consumer that the dataset stored in the zero-duplicate storage buffer on the producer side not be altered, overwritten, refreshed, or otherwise released prior to the expiration of the buffer holding time.

In the next step, the data consumer may communicate to the producer-side buffer controller via the control channel of the data communication interface, for example, an acknowledgment message indicating that the consumer device has successfully received the dataset in its zero-duplicate buffer. The acknowledge message, may further include the buffer holding time information item. In some alternative implementations, the buffer holding time information item may be communicated in a separate message from the acknowledgement message via the control channel of the data communication interface.

By communicating the buffer holding time information item from the consumer side to the buffer controller on the consumer side, the time required to preserve the dataset on in the zero-duplicate buffer can be obtained by the buffer controller. Such a buffer holding time, for example, may be measured solely by the producer side buffer controller without needing to synchronize a clock with the data consumer. That is, a local timer can be started in the producer side buffer controller upon reception of the buffer holding time information item independent of any time keeping maintained by the data consumer.

In some further example implementations, if the data consumer later determines that the initial buffer holding information item needs modification, a supplemental buffer holding time information item may be further transmitted to the producer side buffer controller via the control channel of the data communication interface, via a supplement control message. The supplemental buffer holding time information item allows the holding time to be lengthened or shortened depending on the modification by the data consumer. Such modification of the dataset holding time, for example, may be included in the supplementation control message as a modified overall holding time, or alternatively, a differential holding time, relative to the initially communicate holding time.

The advantage of shortening the buffer holding time is that by informing the buffer controller on the data producer side of the shortened holding time, the zero-duplicate data buffer management system is able to release the storage space occupied by the dataset, release the corresponding synchronous data channels in the data communication interface, and allocate the buffer space to other new datasets that in turn would be synchronized with the zero-duplicate buffer on the consumer side more quickly. This increases the overall efficiency and throughput of the zero-duplicate buffer management system.

On the other hand, should the original buffer holding time need to be extended (e.g., when the consumer needs more time to process and access the dataset via direct-memory-access) but the buffer controller on the producer side is not informed by the extension, buffer holding time may potentially be prematurely terminated by the buffer controller on the producer side prior to the consumer finishing its access of the dataset. That may cause release of the corresponding buffer storage space and overwriting of the storage space with new data, resulting in spoliation of the dataset still being used by the consumer due to an inadvertent of synchronization of the new data. Therefore, particularly when the buffer holding time needs to be extended, it is critical for the data consumer to be able to adjust the original buffer holding time information item and convey the adjusted holding time using the supplemental control message to the buffer controller on the producer side for extending the buffer holding time as necessary to ensure no data spoliation.

In the next step, upon expiration of the buffer holding time of the dataset, the buffer controller on the data producer side may then free or release the buffer storage space occupied by the dataset, and, if needed, use the space for new datasets from the same data producer or a different data producer which may be further quasi-synchronized with the consumer side zero-duplicate buffer, as described above.

In addition, in some example implementations, in order to more efficiently manage the zero-duplicate storage buffer and preserve any possibly required datasets for as long as possible, the buffer space is not released immediately after the corresponding buffer holding time expires. Instead, the allocated buffer storage space may only need be released when additional storage is actually required to store new high priority datasets from the data producers. As such, the prior allocated data storage space may be held as long as needed, hence a term "lazy" buffer management. One particular advantage for such approach is that if the consumer, for whatever reason, needs the dataset again after its buffer holding time has expired, the consumer may still be able to transmit a supplemental control message to the producer side of the buffer controller for placing the buffer space in holding with a new holding time.

In some example implementations, the consumer side buffer holding time may also be conjunctively implemented along with another holding time from the producer side for the buffer controller to manage the initiation of the data synchronization and the release of the buffer space. The producer side buffer holding time, for example, may be configured for purposes of performing garbage collection tasks. Specifically, the particular buffer space may be maintained without alteration during the time that garbage collection tasks may be performed. The garbage collection tasks may be performed by a garbage collector. When additional storage is required (under the lazy buffer management approach), the garbage collector may be used to remove the old datasets from the zero-duplicate storage buffer, congregate the released buffer space in to continuous segments, and make room for new datasets.

For example, the garbage holding time (e.g., 200 ms, or other predetermined or configured time lengths) may be implemented by a timer that begins countdown when the received consumer side holding time expires. Alternatively, if the garbage collection tasks do not involve alternation of the underlying datasets, the timer may begin countdown at a time point ahead of the time when the consumer side buffer holding time expires by the amount of the garbage holding time. In such a manner, garbage collection would be completed by the time the consumer side buffer holding time expires. Other joint use of the garbage collection buffer holding time and the consumer side buffer holding time are also contemplated.

Further details of the implementation above are provided in FIGS. 1-6 and are described below in the non-limiting context of autonomous driving system.

FIG. 1 shows an autonomous vehicle system interacting with example possible road markings and obstacles according to the embodiments of this disclosure. In FIG. 1, the autonomous vehicle 102 includes a plurality of data producer devices which read and interpret the road markings and obstacles near the vehicle in either a continuous or intermittent basis. In this example, the autonomous driving vehicle includes one or more cameras 104 of visible optical spectral range, one or more LIDARs 106, one or more infrared cameras 108, one or more data analyzers 110 as part of its data consumer devices. These data analyzers 110, for example, may receive and/or aggregate data from other devices to produce new datasets, and thus may simultaneously act as data consumer devices.

A camera 104 in the visible optical spectral range, for example, is typically used in autonomous vehicles to identify road markings 114, weather conditions, obstacles 112 (such as other vehicles), pedestrians 116, and the like. These cameras produce optical image data which must be analyzed by an image processing or graphics processing unit. A LIDAR 106, for example, produces data by generating pulses of light to detect objects and measure object distances. This is particularly useful for autonomous vehicles because the LIDAR 106 allows the vehicle to measure the distance to nearby static or moving obstacles or other vehicles. Infrared cameras 108, for another example, are also particularly useful in autonomous vehicles because they allow the vehicle to measure the heat distribution of an approaching obstacle and to image the surroundings in darkness. Combining this data with that of the cameras 104 and LIDARs 106, for example, allows for the vehicle to assess if an approaching obstacle is a living creature or an inanimate object. This combination of producing, transmitting, combining, and analyzing the data from the various data producers demands a fast, real-time, and efficient method to transmit/synchronize/refresh data from the data producer devices (data producers) to the data consumer devices (data consumers). The data consumers, not shown in FIG. 1, may include, for example, any devices or analyzers that require datasets from the data producer devices as input.

Figure 2:
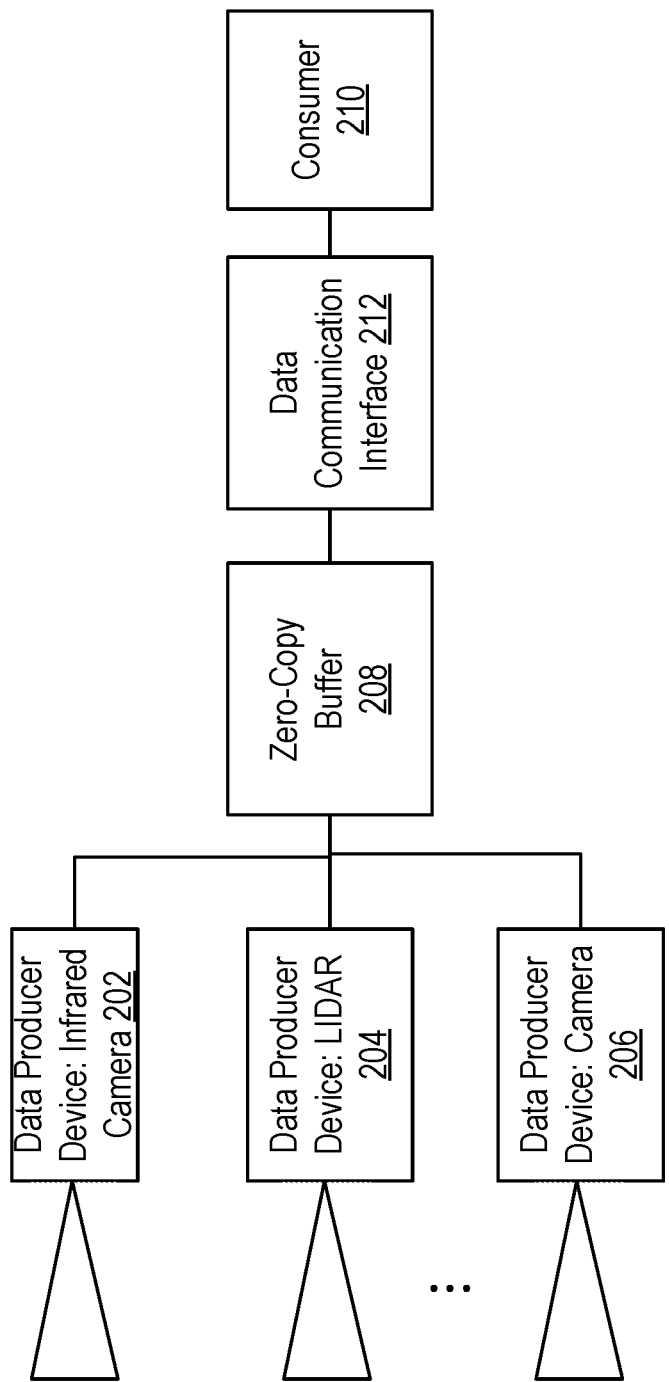
FIG. 2 shows an example top-level system schematic for provisioning a zero-duplicate storage buffer communicating with a shared data communication interface.

FIG. 2 shows a block diagram depicting as an example how the data producers of FIG. 1 generate datasets and transmit/synchronize the datasets to the various data consumer devices. The infrared camera 202, LIDAR 204, and optical camera 206 each produce separate datasets or data streams for the autonomous vehicle to understand its environment and make operational decisions. However, as there is a limited amount of physical space in the zero-copy buffer 208 and the transmission and computation of data is not instantaneous, a priority order of the data may be determined among the various data producers to maintain an efficient transmission and synchronization to the consumer 210 via a data communication interface 212.

Datasets, data streams, or data frames generated by the various data producer devices of FIG. 1, prior to being stored in a zero-copy buffer, may be analyzed by a priority controller to determine the priority of the datasets associated with data producers. As described above, priority of the data producers can be assigned based on a number of factors including but not limited to refresh time required by the data producer, size of the dataset produced, importance of the dataset produced, data variation time constant, operating status of the data producers, and the like.

For example, the LIDAR 204 may produce a coarser and smaller dataset (e.g., point cloud) per refresh frame than a high-resolution camera. Furthermore, it may be determined that the LIDAR is a more important data producer than the camera because of its capability in determining object depth. These various factors may all be considered using a predetermined algorithm to determine the priorities. In some alternative implementations, such priorities may be predetermined as a default levels and then adjusted based on the changes in the factors above. For example, the priority controller may determine at a particular moment that the LIDAR receive a higher priority over the camera.

A data producer may also be given priority based on the operational status of the data producer. For example, if a data producer is broken, blocked, or not producing useful data, it may be be given a lower priority (or adjusted to lower priority) than a data producer which is producing useful information.

The advantage of assigning data producers a priority order is that the data producer with a higher priority can have its datasets allocated with storage space in the zero-duplicate buffer and transmitted/synchronized to the data consumer via the synchronous channels of the data communication interface more consistently than a data producer with a lower priority.

Figure 3:
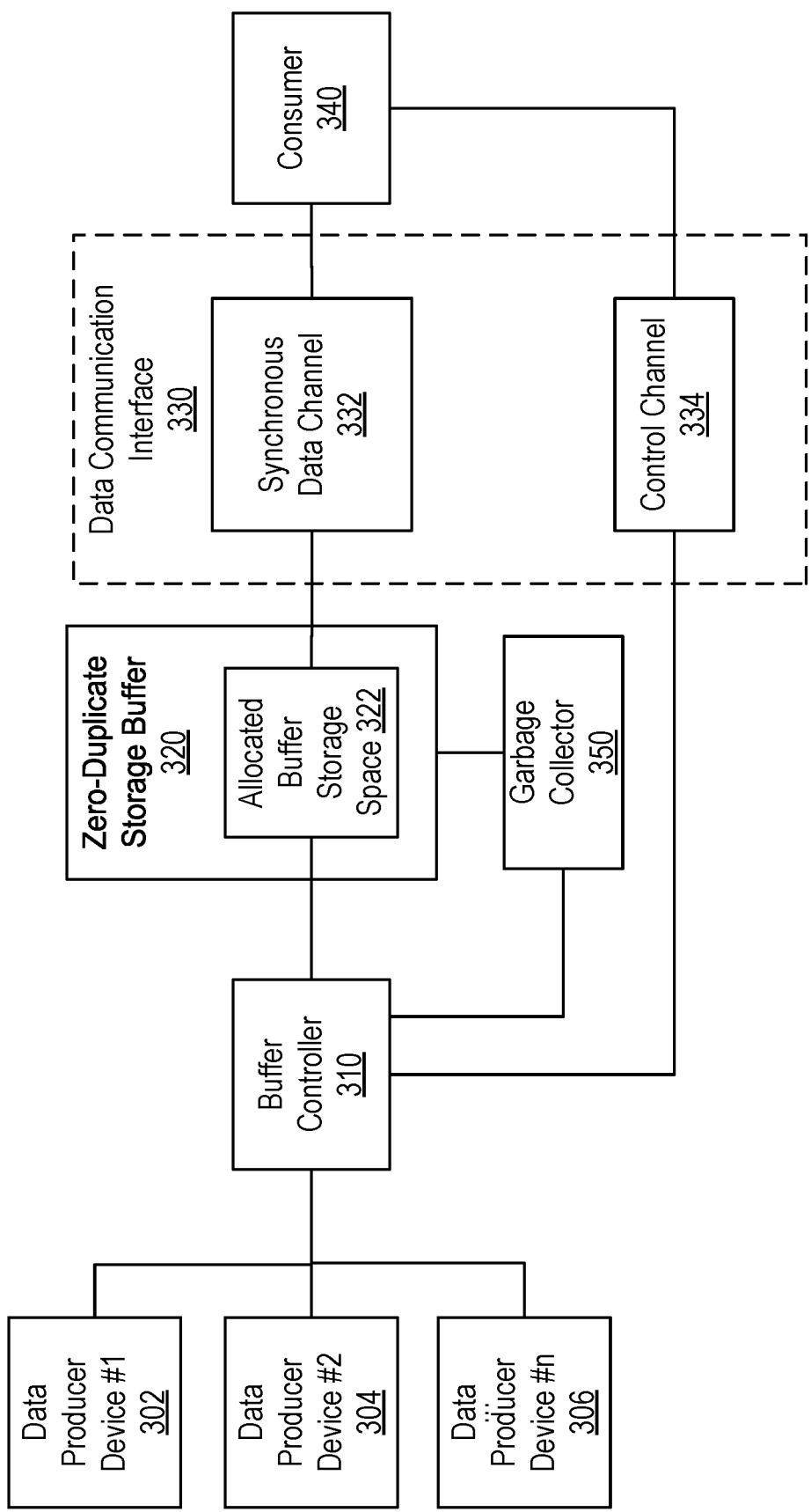
FIG. 3 illustrates another top-level system schematic for controlling a zero-duplicate storage buffer in communication with a shared data communication interface.

In FIG. 3, a more detailed schematic is illustrated showing the data collection from the data producer devices (or data producers) 302, 304, and 306, the storage allocation in the zero-duplicate storage buffer 320 on the producer side, and data transmission/synchronization with the consumers (one consumer is shown as 340) via the data communication interface 330, as provisioned by the buffer controller 310. The plurality of data producers generate datasets of varying priorities and provide the datasets to the zero-duplicate storage buffer 320. The buffer controller 310 prioritizes the datasets and stores the datasets with the highest priority to an allocated buffer storage space 322 within the zero-duplicate storage buffer 320. The datasets remain in the allocated buffer space 322 and are then called upon to be transmitted/synchronized to the data consumer via the shared data communication interface 330. The request for and triggering of allocation of synchronous data channels 332 in the data communication interface 330 may also be based on the priority of the datasets. Once the synchronous data channels 332 are allocated and data synchronization establishes between the allocated buffer storage space 322 and the consumer side buffer, acknowledgement may be communicated from the consumer side to the producer side buffer controller 310 via a control message carried in, for example control channel 334 of the data communication interface 330. The control message may include a buffer holding time associated with the allocated buffer storage space 322 as determined by the consumer 340. After receiving the buffer holding time from the data consumer 340 via the control channel 334, the buffer controller 310 may provision the release of the allocated buffer storage space 322, taking into consideration the received buffer holding time.

As further shown in FIG. 3, a garbage collector 350 may be used to manage the storage space house-keeping of the zero-duplicate storage buffer 320 in conjunction with the buffer controller 310 before the allocated storage space 322 is released. Once the allocated buffer storage space 322 is released following various garbage collection tasks, the allocated buffer storage space 322 then becomes available to be rewritten with allocation of new datasets from the data producers.

The control channel 334 of the data communication interface 330 may be implemented as a hardware or software interruption mechanism between the buffer controller 310 and the consumer 340 to relay control messages including the acknowledgement message that include the buffer holding time and other control information items. An advantage of using an interrupt signal as the control interface channel is that such communication of control information between the buffer controller and consumer can be virtually instantaneous. This is advantageous because it allows a more accurate time stamping by the consumer to send the buffer holding time without having to be concerned about small data synchronization delays. That is, this near instantaneous interruption-based control information exchange allows the consumer and producer to coordinate the transmission of the dataset and holding time of the dataset within the allocated buffer storage space 322 only using a single continuous clock located within the buffer controller 310.

While the consumer side components are shown collectively as the consumer 340 in FIG. 3, they may include a consumer side zero-duplicate buffer and corresponding buffer controller in communication with the data communication interface 330.

Figure 4:
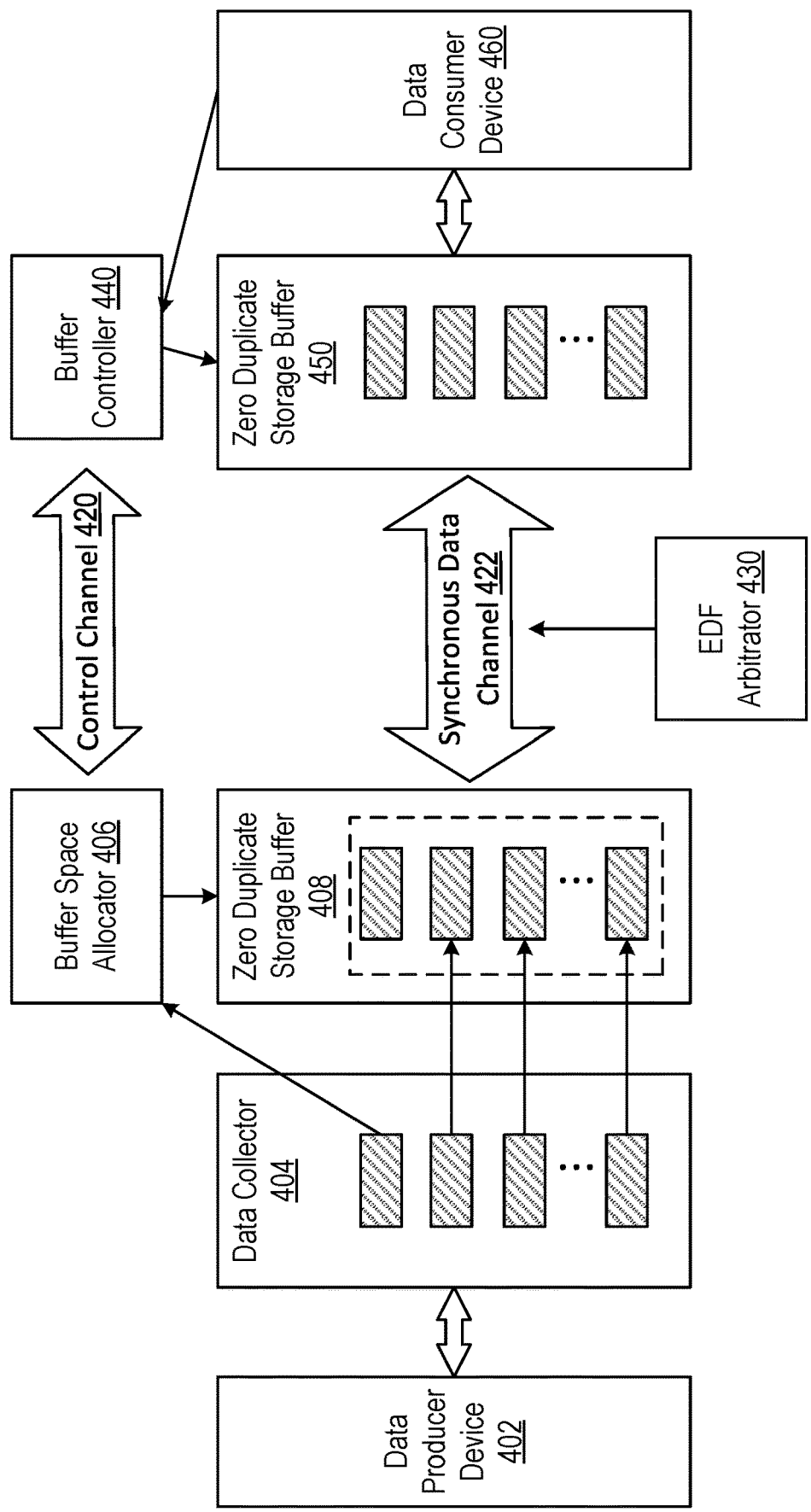
FIG. 4 illustrates detailed system schematic of an example implementation for provisioning a zero-duplicate storage buffer and communication channels.

FIG. 4 shows a further detailed schematic representation of an operation of a zero-duplicate storage buffering control system. In FIG. 4, the consumer side buffer controller is shown as comprising a data collector 404, a buffer space allocator 406 and an EDFA 430. Furthermore, the consumer side is shown to include a zero-duplicate buffer 450 and a buffer controller 440 in addition to a data consumer device 460. The producer side zero-duplicate buffer 408 and the consumer-side zero-duplicate buffer 450 are synchronized via allocation and controlling the synchronous data channels 422 in the data communication interface.

In this example, the data collector 404 may be responsible for receiving and prioritizing the datasets produced by the data producer device(s) 402. That is, the data collector 404 receives multiple datasets or data streams as data frames or sequenced data packets from each data producer and determines their priorities as described above. In other words, datasets with more urgent deadline of delivery are associated with higher priority levels.

The buffer space allocator 406 may be responsible for allocating the datasets received from the data collector 404 to a storage space in the zero-duplicate buffer 408 according to the priorities. The buffer space allocator 406 may also be responsible for communicating with the consumer-side buffer controller 440 via the control channel 420 of the data communication interface to, for example, receive buffer holding time information item from the consumer side separate from or along with receiving acknowledge or confirmation of data reception from the consumer side. The buffer space allocator 406 may further be responsible for managing the release of allocated buffer space.

Correspondingly, the buffer controller 440 at the consumer side may be responsible for controlling synchronization of datasets in the consumer-side zero copy storage buffer 450 with the zero duplicate storage buffer 408 at the producer side via the allocated synchronous data channel 422, estimating buffer holding times for synchronized datasets, and communicating the estimated buffer holding times or supplemental buffer holding times and data reception acknowledgement to the producer side via the control channel 420 of the data communication interface.

Furthermore, as is shown in FIG. 4, requests of synchronous channels may be provisioned by the EDFA 430. The EDFA 430, for example, may be responsible for requesting and opening synchronous data channels 422 for datasets according to the priority information described above, e.g., it may request the data communication interface to synchronize datasets allocated in the buffer with the consumer side using the EDF approach. This ensures that the consumer receives the most time sensitive data first and that the priority information is considered. As further shown by the shaded boxes in FIG. 4, each dataset may include a sequence of data packets.

Figure 5:
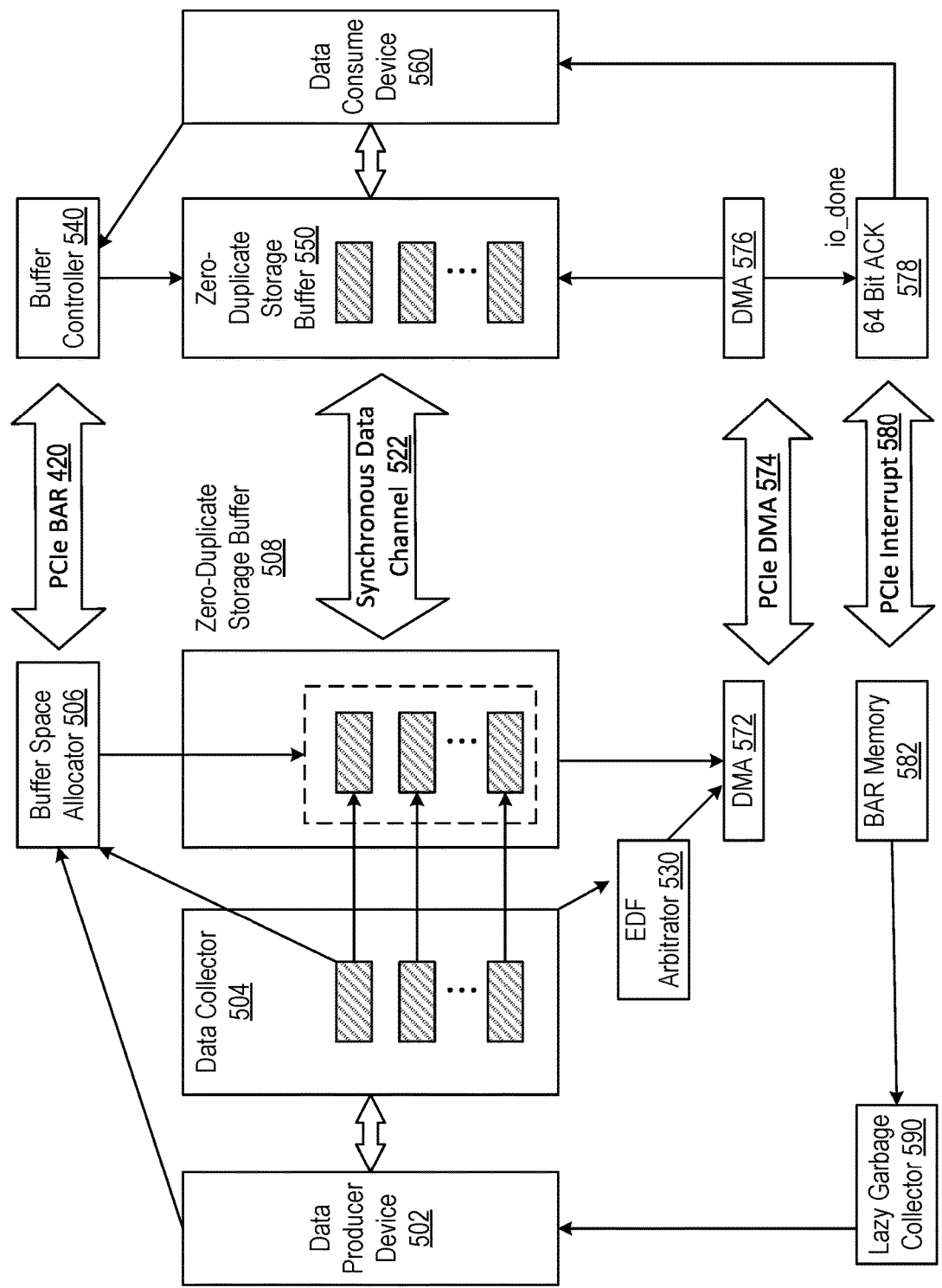
FIG. 5 shows a detailed schematic of another example implementation of a zero-duplicate storage buffer and communication channels.

The data communication interface in FIG. 5 and other embodiment above may be implemented as any types of data communication interface. Such communication interface may be a serial or parallel data communication interface. For example, such data communication interface may be implemented as a PCIe serial data communication interface comprising PCIe controllers and data buses. The PCIe interface provides serial data communication with low latency and high data transfer rates. However, the PCIe interface is a mere example, the various embodiments disclosed above is not so limited.

FIG. 5 provides a further detailed schematic and data flow of an example implementation for data communication from a data producer to a data consumer using zero-duplicate buffers and corresponding buffer controllers via a PCIe data communication interface. The functions of the various components in FIG. 5 are described below.

As shown in FIG. 5, the zero-duplicate storage buffer 508 may be configured and assigned for producer-consumer data communication by a buffer space allocator 506 for managing PCIe buffers.

The data collector 504 may be configured to collect a numbered sequence of data packets of a dataset, a data stream or a data frame from the data producer device 502. The data packets, for example, may include UDP packets. The data collector 504 may be part of a system program logic (PL) configured to provision the various component of the data communication system of FIG. 5.

The buffer space allocator 506 may be further configured to allocate storage space within the assigned zero-duplicate storage buffer 508 for the sequence of data packets. The buffer space allocator 506 may be a CMA (Continuous Memory Allocator) when fragmented memory space is not supported. Continuous memory allocation may be generally easier to manage. The buffer space allocator 506 may be additionally configured to maintain a buffer list and mapping of the buffer storage space and datasets.

The buffer space allocator 506 may be further configured to control the data collector 504 to process the UDP packets and store the packets in the allocated storage space in the zero-duplicate storage buffer 508 according to priority information, as described above. The UDP packets may be sequentially processed and stored by the data collector 504. For example, a dataset may contain N (N being a positive integer) packets, and the N packets may be processed and stored from packet 0 to packet N−1.

Once the last packet of the dataset is processed and stored in the allocated space of the zero-duplicate storage buffer 508, the data PL may request an EDFA 530 for synchronous data communication via the PCIe interface.

The EDFA 530 may be configured to wait until there is one available synchronous data channel 522 in the PCIe interface. Once the synchronous data channel 522 is available, the EDFA 530 then grants a dataset having the highest priority in the buffer with the synchronous data channel 522 by asserting a grant signal and determining a channel ID. The synchronous data channel 522 may be provisioned by a Direct-Memory-Access (DMA) utility of the PCIe interface (572 and 576), which exchange information and channel assignment via the PCIe DMA channel 574.

The data PL may be configured to further initiate data synchronization via the assigned synchronous data channel 522. The data synchronization, for example, may be managed and provisioned by the DMA utility of the PCIe interface, which performs the data transfer and synchronization with the consumer side buffer via the synchronous data channel 522 of the PCIe interface.

On the consumer side, a buffer controller 540 as part of a main unit (MU) for data management maintains a buffer list and once the MU receives the data in the consumer side zero-duplicate storage buffer 550 via the synchronous data channel 522, the DMA utility 576 (e.g., hardware) on the consumer side triggers an "io_done( )" signal and the "io_done( )" signal triggers to send an acknowledgement message 578 to the producer side via an PCIe interrupt channel (or other control channel) 580. The acknowledgment message 578, for example, may be implemented as an 8-byte long (64 bit) message.

The acknowledgement message 578, as described above, may be embedded within the buffer holding time described above. The acknowledgment message may be received by a base address register (BAR) 582 of the PCIe interface on the producer side. The buffer holding time included in the acknowledgement message may be then used by the buffer space allocator as part of the buffer space allocator 506 to provision the release of the allocated storage space for the dataset in the zero-duplicate storage buffer 508.

After sending the acknowledgement, the DMA facility on the consumer side may be further configured to notify a target application on the consumer side for direct-memory-access via, for example, a user memory space notification mechanism. Alternatively, a polling mechanism may be used by the consumer side application to poll and access buffered data.

FIG. 5 further shows a garbage collector 590 for performing garbage collection to generate list of empty/released buffer spaces. The operation of the garbage collector, as described above, may be associated with a producer side buffer holding time which collaboratively interact with the consumer side buffer holding time for the management of release of the allocated storage space in the zero-duplicate storage buffer 508 in a lazy buffer management manner.

Figure 6:
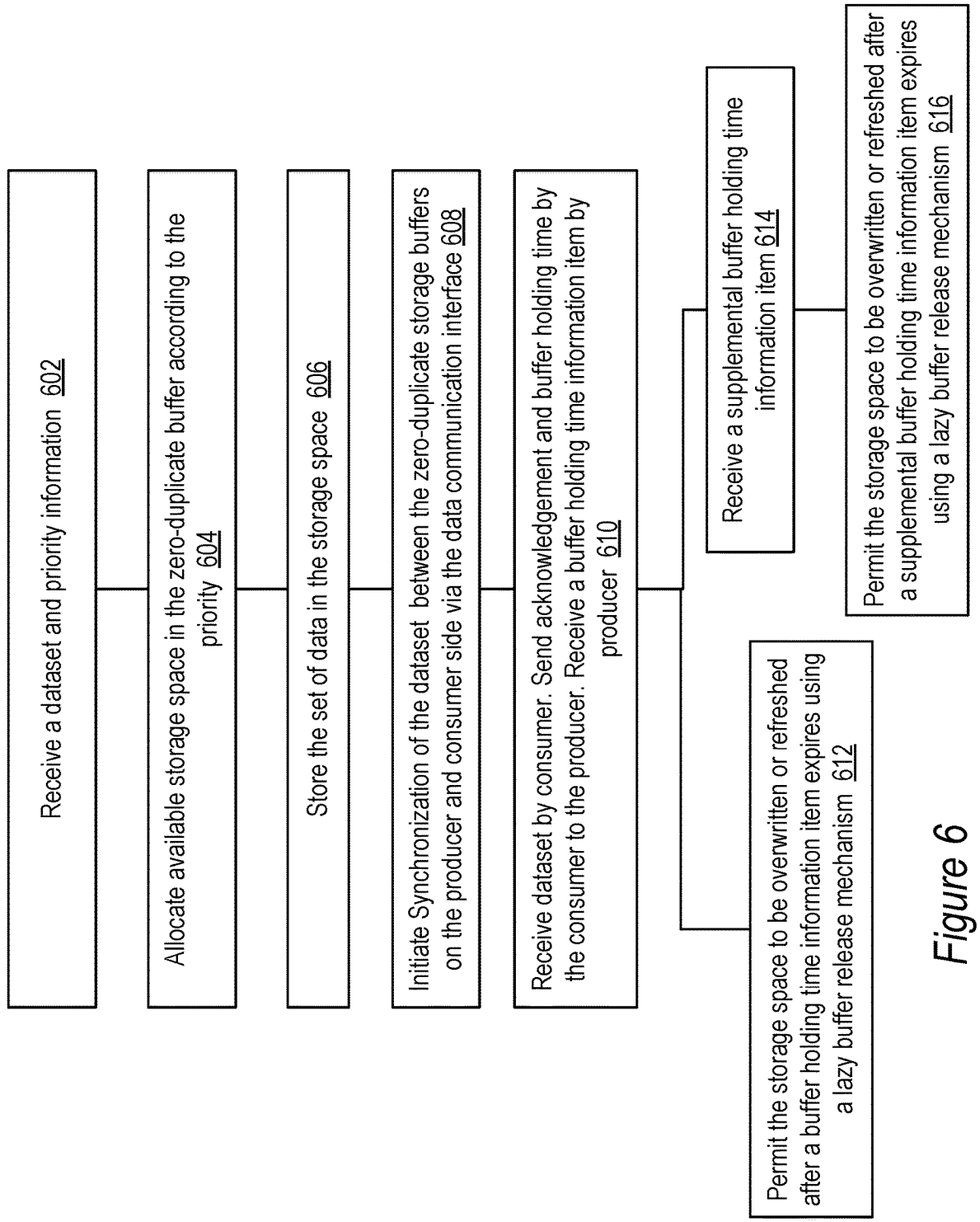
FIG. 6 shows an example flowchart for controlling a zero-duplicate storage buffer in communication with a shared data communication interface.

FIG. 6 shows a flow chart for the real-time priority based lazy buffer management with holding time for data communication in a producer-consumer system. As shown in step 602, the flow chart starts with at least one data producer generating a dataset. As previously discussed, the dataset is assigned a priority level based on various factors.

As shown in Step 604, the zero-copy buffer controller then assigns the data to an allocated buffer space based on the priority level of the dataset. In step 606, the dataset is stored in the allocated buffer space within the producer-side zero-duplicate buffer. In step 608 and following an EDF approach, the data synchronization channel(s) in the data communication interface between the consumer and the producer is requested and triggered based on the priority level. Once the data channel is assigned, the dataset is synchronized from the allocated buffer space on the producer side via direct-memory-access across the data channel to the zero-duplicate buffer on the consumer side.

In step 610, the dataset is received at the consumer-side buffer and the consumer sends a message via a control channel of the communication interface confirming reception and requesting a buffer holding time. For the duration of the buffer holding time (dictated by the buffer holding time information item), the dataset will remain synchronized between the allocated buffer space and the data consumer buffer via the allocated synchronous channel without being overwritten.

As shown in step 612, if no modification to the buffer holding time information item is further requested by the consumer during the holding of the buffer space, the zero-copy buffer manager may release the storage space and permit it to be overwritten or refreshed after the buffer holding time expires, but using a lazy buffer management approach (release until necessary). As shown in step 614, if the data consumer requires more or less time than dictated by the original buffer holding time information item, the data consumer can request a supplemental buffer holding time. As shown in step 616, in the case where the supplemental buffer holding time modifies the buffer holding time, the zero-copy buffer manager may permit the storage space to be overwritten or refreshed according to a timing as modified by the supplemental buffer holding time (to be earlier or later than the original expiration time).

In the case where the supplemental buffer holding time modifies the buffer holding time to expire after the original buffer holding time was set to expire, two different example scenarios may occur.

In the first scenario, the supplemental buffer holding time requesting a later expiration time may be received prior to the original buffer holding time information item expiring. In this case, the original buffer holding time may be extended to meet the requirements of the supplemental buffer holding time. After the new buffer holding time has expired, the zero-copy buffer manager may then permit the storage space to be overwritten or refreshed using the lazy buffer management approach.

In the second scenario, the supplemental buffer holding time requesting a later expiration time may be received after the original buffer holding time has already expired. In this case, the zero-copy buffer manager must first ensure that the dataset has not been released or overwritten (under the lazy buffer management approach) before modifying the buffer holding time. If the data set has already been deleted or overwritten, synchronization will not be reestablished, and the request for the supplemental buffer holding time will be denied. If the dataset has not been deleted or overwritten and still remains unaltered in the allocated buffer block, synchronization between the allocated buffer block and the data consumer may be reestablished and the request for the supplemental buffer holding time will be accepted, and the holding for the buffer space will continue until the modified holding time expires.

In each of these cases, it is possible to receive numerous supplemental buffer holding times from the data consumer for modifying the buffer holding process. For each new supplemental buffer holding time received, the same process above may be used to accept or reject the supplemental buffer holding time.

The description and accompanying drawings above provide specific example embodiments and implementations. Drawings containing device structure and composition, for example, are not necessarily drawn to scale unless specifically indicated. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof. For example, the components described above may be separate implemented, split into further sub components, or combined, each of these components, their subcomponents, and their combinations may be implanted as dedicated processing units such as an ASICs or in programmable circuits such as FPGAS.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for managing storage buffer, comprising:
   receiving a set of data and a priority timing information item;
   allocating a storage space in a first storage buffer and storing the set of data in the storage space according to the priority timing information item;
   synchronizing the set of data with a second storage buffer via a data synchronization channel of a shared serial data communication interface between the first storage buffer and the second storage buffer;
   receiving at least one buffer holding time information item via an interruption channel in the shared serial data communication interface; and
   permitting the storage space to be overwritten and refreshed with new data after a holding time has expired, the holding time being determined according to the at least one buffer holding time information item.

2. The method according to claim 1, wherein:
   the at least one buffer holding time information item comprises an initial buffer holding time, the initial buffer holding time being transmitted via the interruption channel by the second storage buffer in response to receiving the set of data from the data synchronization channel; and
   the holding time corresponds to the initial buffer holding time.

3. The method according to claim 2, wherein:
   the at least one buffer holding time information item comprises an initial buffer holding time and a supplemental buffer holding time information item, the supplemental buffer holding time information item being transmitted via the interruption channel by following the transmission of the initial buffer holding time from the second storage buffer; and
   the method further comprises determining the holding time by modifying the initial buffer holding time according to the supplemental buffer holding time information item.

4. The method according to claim 3, wherein:
   the supplemental buffer holding time information item comprise a request for extension of the holding time; and
   the method further comprises determining the holding time by extending the initial buffer holding time according to the supplemental buffer holding time information item when the storage space has not been subject to refresh yet.

5. The method according to claim 3, wherein
   the supplemental buffer holding time information item comprises a permission for reduction of the holding time; and
   the method further comprises determining the holding time by reducing the initial buffer holding time according to the supplemental buffer holding time information item such that the storage space is permitted to be overwritten or refreshed according the expiration of the holding time as reduced.

6. The method according to claim 1, further comprising refreshing the storage space with new data after the holding time has expired.

7. The method according to claim 1, wherein the first storage buffer, the second storage buffer, and the shared serial data communication interface are part of a control system in an autonomous driving vehicle.

8. The method according to claim 7, wherein:
The set of data and priority information are received from one of a plurality of sensors installed in the autonomous driving vehicle; and
the plurality of sensors comprise one of:
one or more cameras;
one or more LIDARs;
one or more temperature sensors;
one or more infrared cameras; or
one or more rain detectors.

9. The method according to claim 8, wherein the priority timing information item comprises a data synchronization deadline by the shared serial data communication interface.

10. The method according to claim 9, the data synchronization deadline indicates a priority of the set of data in comparison to data generated among the plurality of sensors.

11. The method according to claim 10, wherein a closer deadline value for the data synchronization deadline indicates a higher data priority.

12. The method according to claim 9, wherein each of the plurality of sensors are associated with a default data synchronization deadline.

13. The method according to claim 12, wherein data synchronization deadlines associated with the plurality of sensors are dynamically modified.

14. The method according to claim 1, wherein the priority timing information item is determined based on a quality of the set of data.

15. The method according to claim 1, wherein the priority timing information item is determined based on an operational quality a data source generating the set of data.

16. The method according to claim 1, wherein the shared serial data communication interface comprises a PCIe interface.

17. An electronic system comprising a program memory configured to install instructions and a processor, wherein the instructions, when executed by the processor, are configured to cause the processor to:
receive a set of data and a priority timing information item;
allocate a storage space in a first storage buffer and storing the set of data in the storage space according to the priority timing information item;
synchronize the set of data with a second storage buffer via a data synchronization channel of a shared serial data communication interface between the first storage buffer and the second storage buffer;
receive at least one buffer holding time information item via an interruption channel in the shared serial data communication interface; and
permit the storage space to be overwritten and refreshed with new data after a holding time has expired, the holding time being determined according to the at least one buffer holding time information item.

18. The electronic system of claim 17, wherein:
the at least one buffer holding time information item comprises an initial buffer holding time, the initial buffer holding time being transmitted via the interruption channel by the second storage buffer in response to receiving the set of data from the data synchronization channel; and
the holding time corresponds to the initial buffer holding time.

19. The electronic system of claim 18, wherein:
the at least one buffer holding time information item comprises an initial buffer holding time and a supplemental buffer holding time information item, the supplemental buffer holding time information item being transmitted via the interruption channel by following the transmission of the initial buffer holding time from the second storage buffer; and
the instructions, when executed by the processor, is further configured to cause the processor to determine the holding time by modifying the initial buffer holding time according to the supplemental buffer holding time information item.

20. The electronic system of claim 17, wherein the instructions, when executed by the processor, is further configured to cause the processor to refresh the storage space with new data after the holding time has expired.

* * * * *